May 25, 1943.  H. L. BRYAN ET AL  2,319,788
REMOTE SELECTOR AND CONTROL SYSTEM
Filed June 18, 1940  5 Sheets-Sheet 1
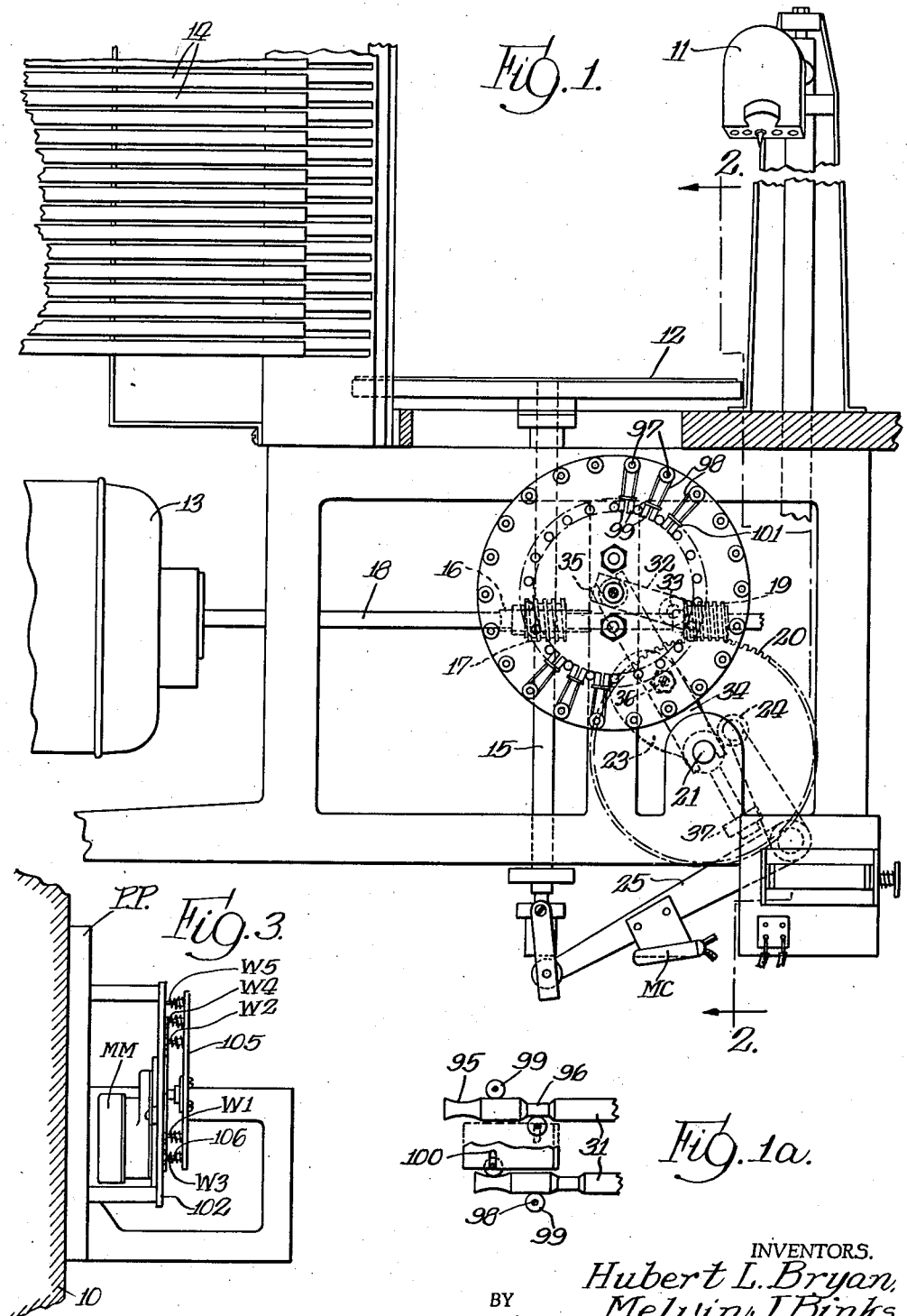
INVENTORS.
Hubert L. Bryan,
Melvin J. Binks,
BY Ernest A. Hegner
ATTORNEY.

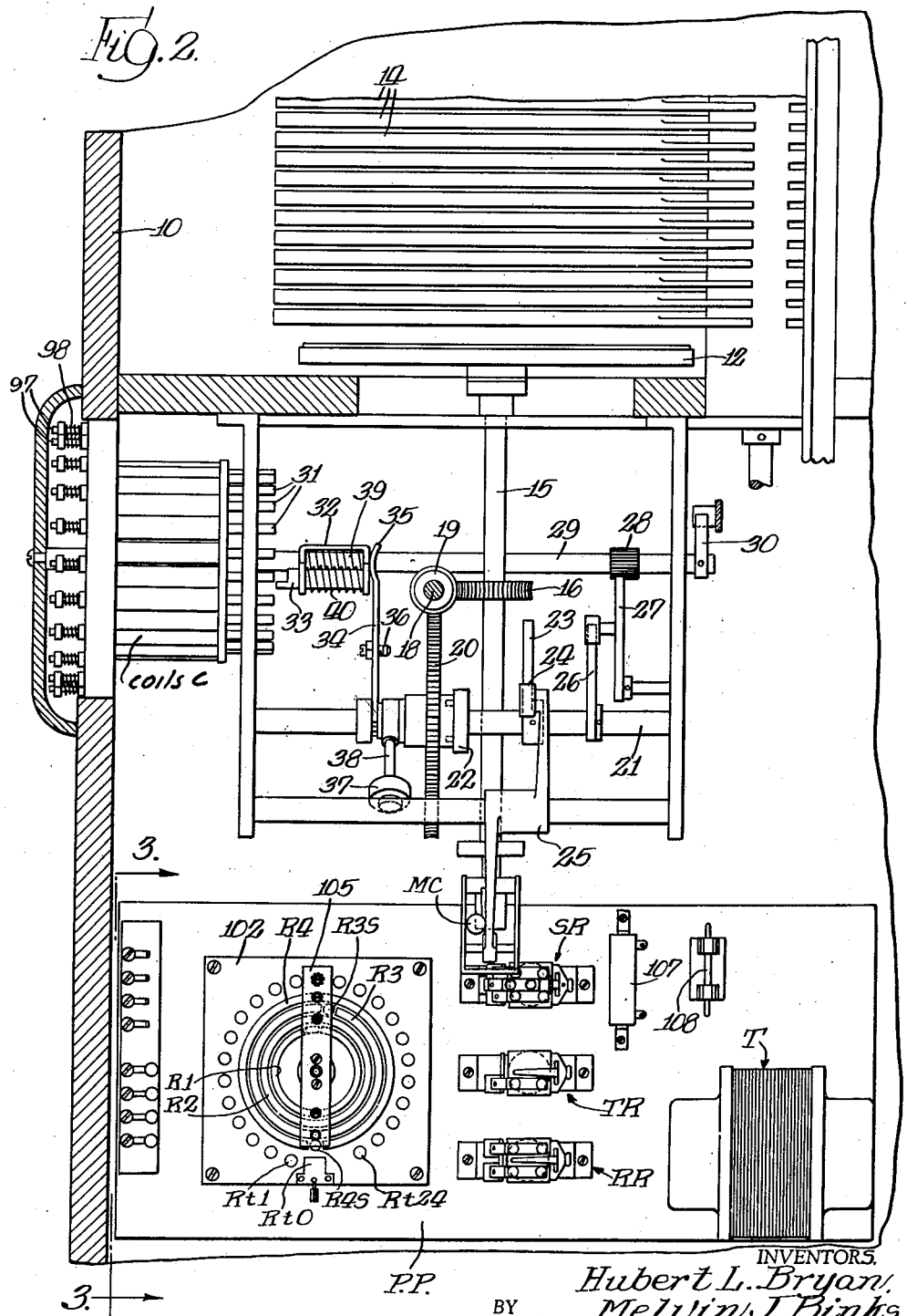

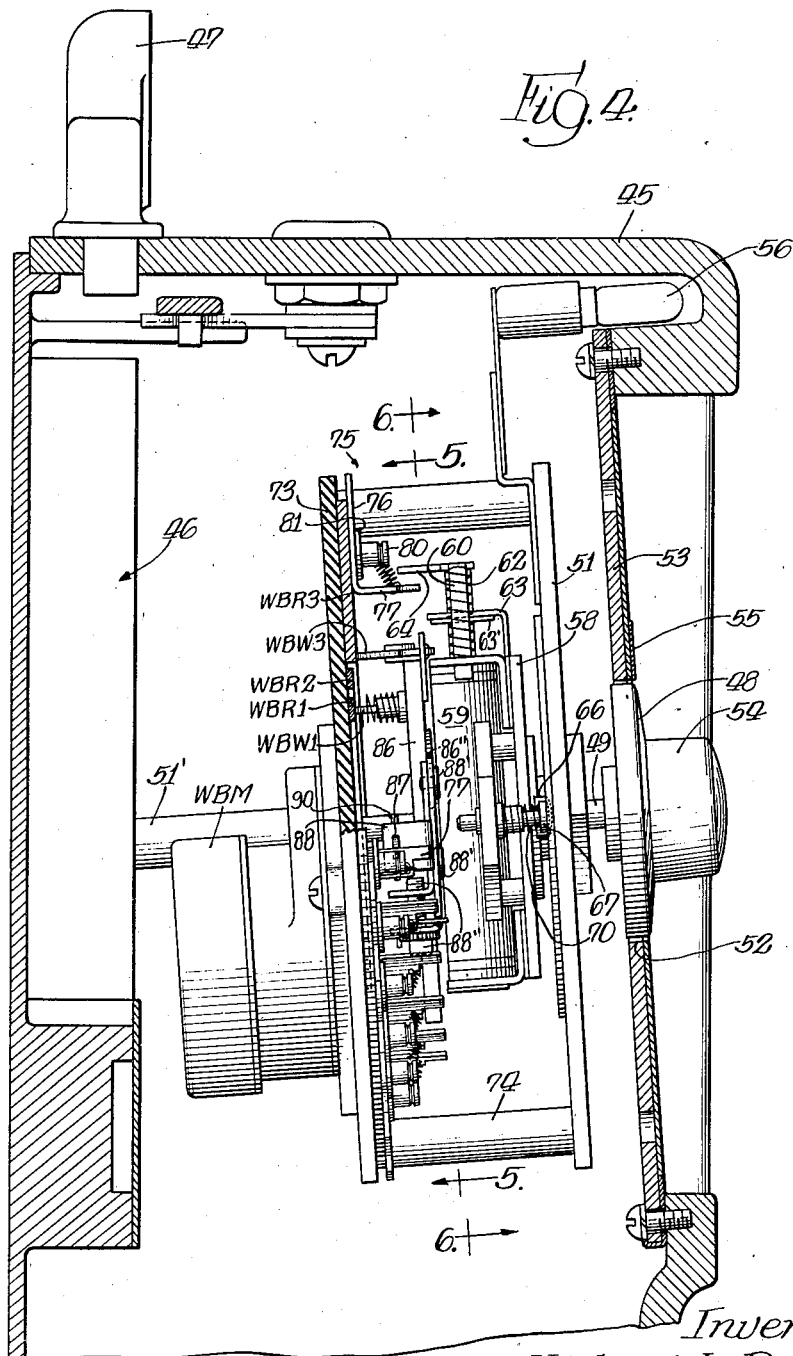

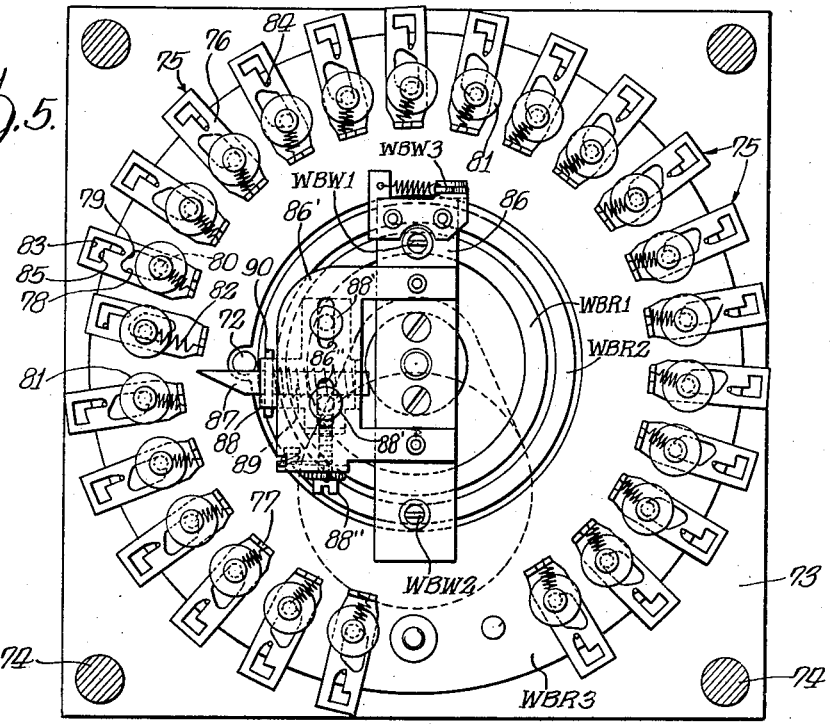
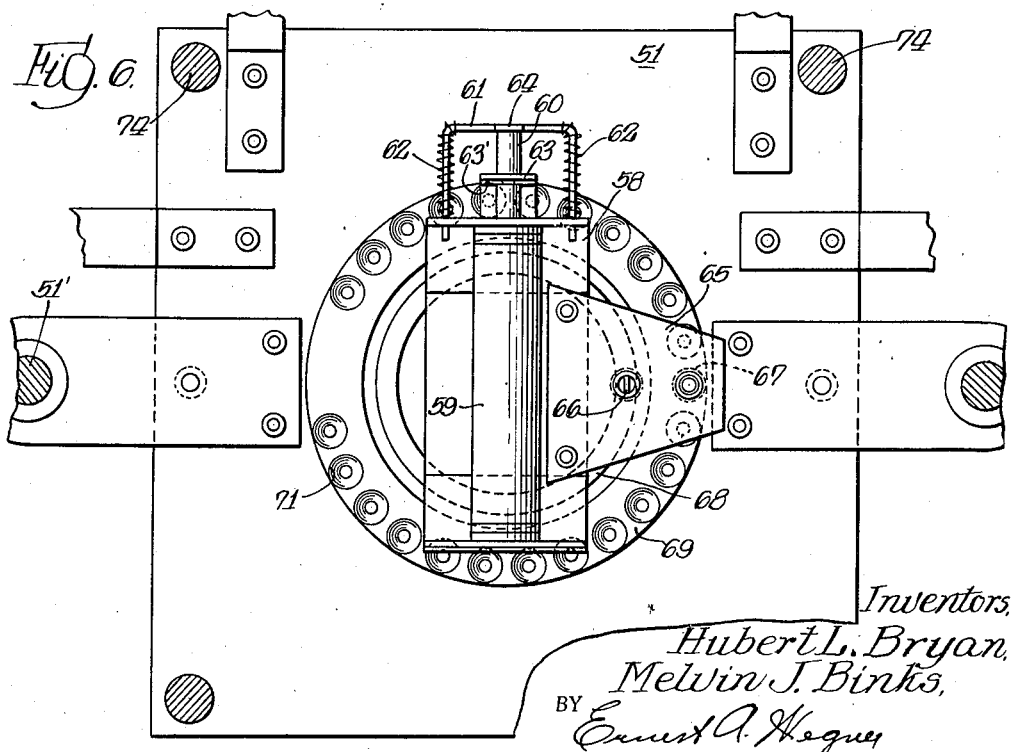

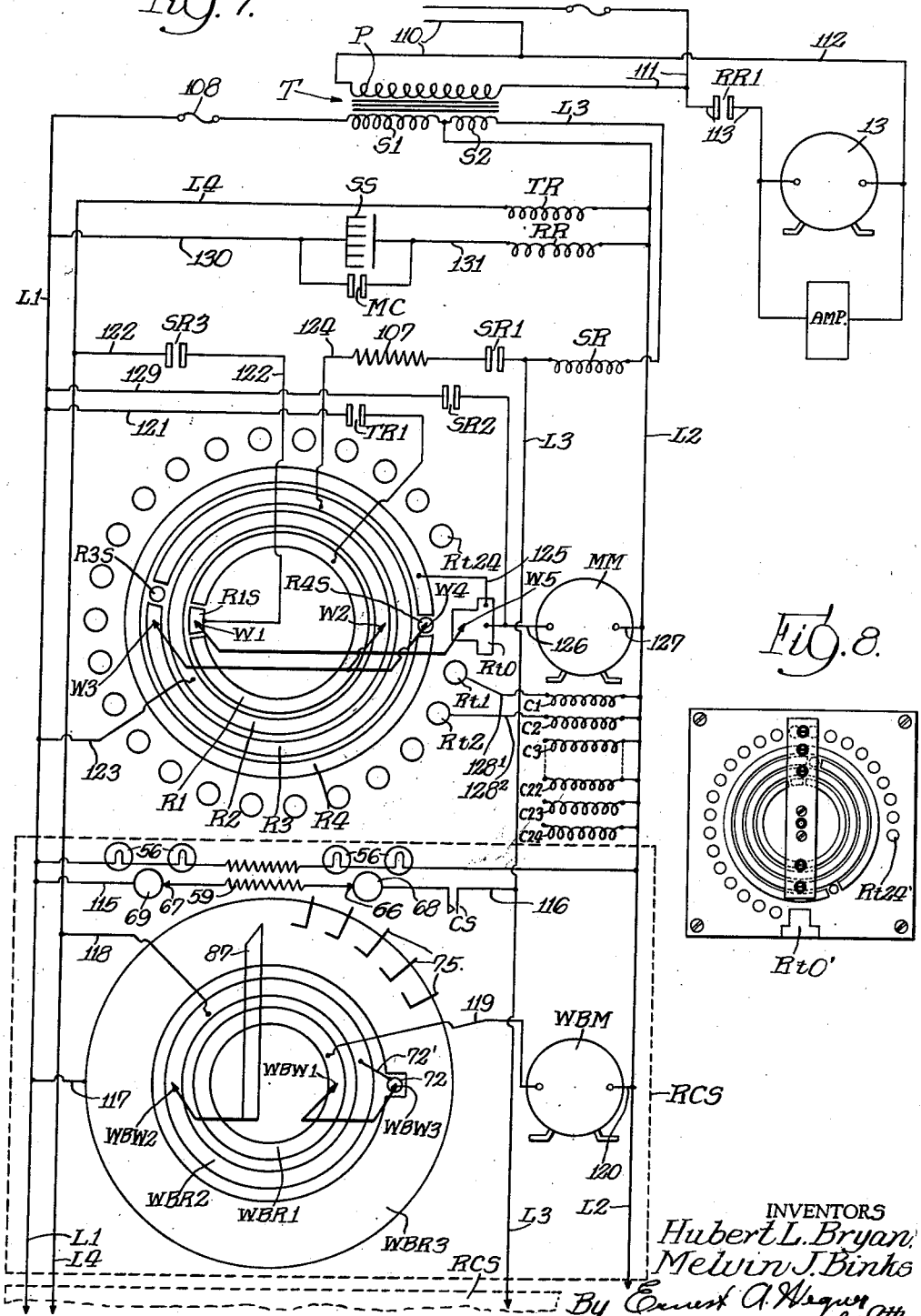

Patented May 25, 1943

2,319,788

UNITED STATES PATENT OFFICE 2,319,788

REMOTE SELECTOR AND CONTROL SYSTEM

Hubert L. Bryan, Dallas, Tex., and Melvin J. Binks, River Forest, Ill.

Application June 18, 1940, Serial No. 341,214

20 Claims. (Cl. 177—353)

The invention relates generally to a remote selector and control system and more particularly to means for controlling from a remote point the selection of a particular record of an automatic phonograph.

One object of the invention is to provide a remote control system having its own electrical circuit between the remote control stations and the device to be controlled in which the number of leads is reduced to a minimum.

Another object is to provide a new and improved remote selector and control system employing a master motor at the device to be controlled and an auxiliary motor at each remote station operated in timed relation.

Another object is to provide a remote selector and control system employing a master motor at the device to be controlled and a motor at each remote station which are normally inoperative and in which the motor at a remote station and the master motor are started with the making of a selection.

Still another object is to provide a control system employing a master motor and a motor at the remote station which are started and stopped with the making of each selection, having new and improved means for assuring the proper timed operation of the motors.

Yet another object is to provide a control system having a master motor and a motor at the remote station, designed to prevent loss of a selection made at any time while the master motor is running as a result of a previously made selection.

Yet another object is to provide a control system designed to prevent the obtaining of a record wholly different from either of two selections made simultaneously.

A further object is to provide a control system having a starter relay for the master and remote station motors operating at a higher voltage from the majority of the system to assure proper operation, regardless of the remoteness of the station.

A further object is to provide in a control system new and improved remotely located selecting mechanism.

Still a further object is to provide remotely located selecting mechanism having a settable element self-locking in set position, serving in set position as one element of a switch, and restorable to normal position upon engagement by a complementary switch element.

A further object is to provide a remote selecting system having an electrically actuated selector unit in which the actuating circuit for the unit is short, independent of the location of the remote stations, and does not include any elements of the remote stations.

Still a further object is to provide in a remote control system of the character described a run relay for the device to be controlled connected in series with parallel switches associated with selector unit and a switch governed by the controlled device to be closed during each cycle of operation and in turn connected in parallel with the parallelly connected switches to take the load therefrom and to maintain the circuit during the playing of the last selection.

Other objects and advantages will become apparent from the following description, taken in connection with the accompanying drawings, in which:

Fig. 1 is a fragmentary view of a phonograph with which the system forming the invention may be associated.

Fig. 1ª is an enlarged fragmentary view of the switch forming end of one of the rods of the selector unit.

Fig. 2 is a fragmentary sectional view taken approximately along the line 2—2 of Fig. 1 and showing the power panel of the control system installed in the phonograph.

Fig. 3 is an end view of the power panel and is taken approximately along the line 3—3 of Fig. 2.

Fig. 4 is a fragmentary sectional view of a remote station unit forming a part of this invention.

Fig. 5 is a view taken approximately along the line 5—5 of Fig. 4 and looking to the left in Fig. 4, as indicated by the arrows.

Fig. 6 is a view taken approximately along the line 6—6 of Fig. 4 and looking to the right in Fig. 4, as indicated by the arrows.

Fig. 7 is a schematic circuit diagram.

Fig. 8 is an elevational view of a master motor unit of modified construction primarily showing the contact rings and wipers.

While the invention is susceptible of various modifications and alternative constructions, it is shown in the drawings and will hereinafter be described in a preferred arrangement. However, it is not intended that the invention is to be limited thereby to the specific construction disclosed, but it is intended to cover all modifications and alternative constructions falling within the spirit and scope of the invention as defined in the appended claims.

The invention, as above stated, is adapted for the control of a device from a remote point, and is particularly adapted for such remote control of automatic phonographs. The invention will, for purposes of disclosure, therefore, be shown and described as applied to the control of such an automatic phonograph. Generally, such an automatic phonograph comprises a casing or cabinet 10 housing a plurality of records and operating mechanism which includes a tone arm 11, a turntable 12, and a motor 13 for driving the turntable, as well as other mechanism governing the operation of the phonograph. Means is provided for selecting a particular record, transferring the same to the turntable 12, and then bringing the same into contact with the tone arm 11 so as to reproduce the record. The cycle of operation is usually completed by returning the record to its place and stopping the motor 13. Contact between the selected record and the tone arm 11 may be and is accomplished in a variety of ways in different makes of automatic phonographs.

The phonograph here shown, for purposes of disclosure only, has the records supported in annular trays 14 which are pivotally mounted for swinging in a horizontal plane over the turntable 12, which is then given a vertical movement causing the record to be picked up and presented to the tone arm 11. The mechanism for effecting such swinging of a tray 14 as well as the vertical movement of the turntable 12 includes a plurality of gears, shafts, cams, clutches, and yieldable connections which have been disclosed in detail in the Wilcox Patent No. 2,002,236. Reference is had to that patent for a more detailed disclosure and understanding of the operation of the mechanism, there being disclosed herein just such part of the mechanism as is essential to an understanding of the adaptation and operation of the selector and control means.

The table 12 is continuously rotated during a cycle of operation resulting in the playing of one record, and to that end there is splined to the table shaft 15 a worm wheel 16 which meshes with a worm 17 on the shaft 18 of the motor 13. Meshing with a second worm 19 on the shaft 18 is a worm wheel 20 which is loosely mounted on a cam shaft 21 and adapted to be coupled to the shaft 21 by a clutch 22.

Among the cams carried by the cam shaft 21 is a cam 23 which engages a cam follower 24 carried by one arm of a crank 25, the other arm of which is connected to the lower end of the turntable shaft 15. Thus, with rotation of the shaft 21, the crank 25 is pivoted to raise and lower the turntable 12. Also fixed on the cam shaft 21 is a cam 26 which, through suitable means (not fully shown) including a yieldably driven segmental rack 27 and a pinion 28, rotates a shaft 29 until such rotation of the shaft is arrested in a position resulting in a predetermined tray 14 being swung above the table 12 through suitable mechanism including a cam 30 fixed on the shaft 29. This means varies with the different makes of phonographs, but usually consists of a plurality of stops which are selectively positionable in the path of a member whose extent of travel determines the record to be played. As herein shown, these stops take the form of a plurality of annularly arranged rods 31 concentric with the shaft 29, which rods and associated elements will hereinafter be termed the selector unit. Adapted to cooperate with the rods 31 of the selector unit is a bracket 32 which is non-rotatably mounted on the shaft 29 and which carries a suitably notched and projecting finger 33 at its outer end.

The finger 33 is spaced radially of the bracket 32 to be disposed at the same radius as the rods 31, but is so positioned longitudinally of the shaft 29 that its notched end clears the rods 31 when in their normal position, but engages and is arrested against further rotation by any of the rods 31 which has been shifted inwardly, that is, to the right as viewed in Fig. 2.

The bracket 32 and finger 33 not only serve to arrest rotation of the shaft 29 to determine the record to be played, but also serve to restore a projecting rod to its normal position at the proper time in the cycle of operation. To that end, there is loosely mounted on the shaft 21 a member 34 having a bifurcated end 35 straddling the shaft 29 and engaging the bracket 32. Carried intermediate the ends of the member 34 is a projecting stud 36 which is adapted to be contacted by a follower 37 on an arm 35 fixed on the cam shaft 21. Engagement of the follower 37 with the stud 36 causes the bifurcated end 35 of the member 34 to shift the bracket 32 longitudinally of the shaft 29 and through such shift the finger 33 is also shifted to restore the rod 31 to its normal position. Suitable springs 39 and 40, respectively surrounding the shaft 29 and the finger 33, restore the bracket 32 and the finger 33 to their normal position.

Summarizing briefly, the operation of the phonograph mechanism is as follows: With the starting of the motor 13, cam shaft 21 is rotated and, through cam 26 and associated mechanism, rotates shaft 29 until the finger 33 of bracket 32 engages and is arrested by a rod 31 which has been shifted inwardly into the path of the finger 33. With the rod 29 thus held against further rotation, continued rotation of the shaft 21 through suitable mechanism causes a tray 14 carrying the appropriate record to be swung outwardly over the turntable 12. Through the medium of cam 23 and crank 25, the already rotating turntable 12 is shifted upwardly to pick up the record from the tray 14 and carry the same into contact with the tone arm 11. With the commencement of the playing of the record, the clutch 22 is disengaged, thereby stopping the rotation of cam shaft 21, the turntable 12, however, continuing to rotate until the playing of the record has been completed. Upon completion of the playing of the record, the clutch 22 is again engaged, causing cam shaft 21 to continue its rotation and as an incident to such rotation lowering the turntable 12, depositing the record in its tray 14 and swinging the tray back in its position in the stack of records. Thereafter the motor 13 is stopped and the cycle of operation is complete. During the latter half of the cycle, that is, when the parts are being restored to normal position, the member 34 is actuated to effect restoration of the rod 31 with which it is in contact, in order that the shaft 29 may be freed for rotation during the next cycle so as to case a playing of the next selection.

Having described generally the device, more particularly, one form of phonograph with which the remote control system forming this invention may be associated, the remote control means will now be described in detail. The invention contemplates one or more remotely located control stations each of which, in cooperation with master means located at the phonograph, is operable through proper manipulation to initiate operation of the phonograph and cause the same to play the particular record chosen at the control station. Such control stations are shown diagrammatically in Fig. 7, and are designated RCS.

More particularly, the invention contempaltes manually operable means at the control station for indicating a choice of record to be played, and automatically operable means located both at the station and the phonograph for carrying the choice into effect. Herein such automatically operable means includes a rotary switch means at each the station and the phonograph, driven in timed relationship by motors respectively designated as wall box motor WBM and master motor MM, relays and solenoids constructed and connected, all as shown and hereinafter described.

The remote control stations will first be considered, and, inasmuch as the stations are identical, only one will be described. Remote control stations of the type disclosed herein are commonly referred to as wall boxes. In the present instance, such wall box comprises a casing 45 which houses the remote selecting mechanism and coin controlled mechanism, generally designated 46. This coin controlled mechanism forms no part aof this invention and, moreover, is of conventional construction. It is believed sufficient to say, therefore, that the mechanism 46 includes a switch CS which is adapted in conventional manner to be momentarily closed upon the deposit of an appropriate coin or token in the coin receptacle 47 provided for that purpose at the top of the wall box.

The remote selecting mechanism, as previously stated, comprises manually operable means for indicating the choice of record and automatically operable means, herein the wall box motor WBM and the rotary switch means driven thereby, for carrying into effect the choice of record indicated. The manually operable means herein comprises a dial 48 fixed on the forwardly projecting end of a shaft 49 journaled for free rotation in a plate-like support 51 rigidly mounted within the casing 45 on posts 51' extending forwardly from the rear wall of the casing. The dial 48 is disposed in an aperture 52 formed in the front wall 53 of the casing 45 and has formed integrally therewith a projecting and knurled knob 54 by means of which the dial and the shaft 49 may be rotated manually. As more clearly shown in the Binks design application, Serial No. D-91,647, filed April 13, 1940, now Patent No. D-121,362, issued July 9, 1940, the dial 48 carries numbers, while the front wall 53 of the wall box bears numbered lists of the possible choice of records that may be made, as well as a raised arrow 55 or other indicating mark. A person wishing to have a particular record played consults the list to learn the number of that record, and thereupon rotates the dial 48 to bring that particular number opposite the arrow 55. The face of the wall box is indirectly illuminated by suitable lights 56 placed at various points about the front wall but within the casing 45.

Fixedly secured on the inner end of the shaft 49, as best seen in Figs. 4 and 6, is a bracket 58 which supports between its legs a solenoid 59 having a core 60 projecting through one of the legs of the bracket 58. The core 60 has secured to its projecting end a U-shaped member 61 having its legs turned inwardly and projecting slidably through apertures formed in the adjacent leg of the bracket 58, so as to serve as guide means for the core 60. Each of the legs of the U-shaped member 61 has a light compression spring 62 wound thereabout and bearing on the bracket 58, in order constantly to urge the core 60 outwardly. The core 60 is further guided by a bracket 63 which in cooperation with a clip washer 63' also serves as a stop limiting the outward movement of the core 60. Projecting laterally of the plane of the U-shaped member 61 is a finger 64, which serves as a setting means as will presently become more apparent. Secured to the bracket 58 and projecting laterally therefrom is an arm 65, which carries a first wiper 66 electrically connected to one terminal of the solenoid 59 and a second wiper 67 electrically connected to the remaining terminal of the solenoid 59. Wipers 66 and 67 are in constant engagement with conducting rings 68 and 69, respectively mounted on the plate-like support 51 for supplying current to the solenoid 59. As best seen in Fig. 4, the wiper 67 has a rounded head and is yieldably urged outwardly by a light compression spring 70 which also serves to aid in the making of the circuit connection. The wiper 66, though having a different shaped head, is also provided with a light compression spring, not clearly visible in the drawings. The wiper 67 serves the dual function of completing a circuit from the ring 69 to one terminal of the solenoid 59, and of serving as a means for proper positioning of the bracket upon the selection of a record to be played. To that end, the ring 69 is formed with depressions 71 about the periphery thereof, spaced so as to conform with the spacing of the numbers on the dial 48. The arm 65 and the support 51 are of non-conductive material.

Turning now to a consideration of the automatically operable mechanism of the wall box, there is supported parallel with the plate-like support 51 a second plate-like support 73 which is carried by but spaced from the first support 51 by four spacer members 74. Mounted on the support 73 are three conductor rings (see Figs. 5 and 7), designated as wall box rings WBR1, WBR2 and WBR3, respectively, from the inner ring outwardly. Rings WBR1 and WBR2 are continuous and of normal radial width. Ring WBR3, however, is extremely wide in order to provide a base for elements about to be described. The ring WBR3 also is continuous, save at its inner periphery where it is interrupted to form a circular contact 72. This contact is, however, electrically connected with the ring WBR2 (see Fig. 7) by means of a jumper lead 72'.

Disposed about the ring WBR3 are a plurality of settable elements 75, one for each record that might be selected, whose unique construction and mounting constitute a feature of this invention. In the present instance twenty-four such elements are provided, though it is to be understood, of course, that the number may vary, depending upon the number of record supports 14 provided by the phonograph. As best seen in Figs. 4 and 5, each such settable element is L-shaped, having a main portion 76 and a leg 77. Each element 75 is mounted for radial sliding and limited pivotal movement relative to the ring WBR3, and to that end is formed with an elongated slot 78 in its main portion having a generally parallelogram shape so that the outermost end of the slot forms a cam surface 79. Each element is mounted with its major portion 76 in contact with the ring WBR3, with the leg 77 projecting inwardly, and around a stud 80 projecting inwardly from the ring WBR3. A washer 81 retains the element 75 on the stud 80, while a light tension spring 82 connected at one end to the stud 80 and at the other end to the leg 77 urges the element 75 radially outwardly to the extent permitted by engagement of the lower end of the slot 78 with the stud 80, that is, to the position of the majority of elements 75 shown in Fig. 5. Attachment of spring 82 to the leg 77 is preferably inwardly from the end thereof in order not to interfere with the finger 64 of solenoid core 60.

Each element 75 is formed with a second slot 83 which is generally L-shaped, and which is disposed with its stem directed radially inwardly. Projecting into this slot is a very small pin 84 also rigid with the ring WBR3. The slots 78 and 83 are so proportioned that, at the time that the cam surface 79 strikes the stud 80 upon radial inward movement of the element 75, the pin 84 will have passed into the base portion of the slot 83, thereby permitting the action of the cam surface 79 against the stud 80 to pivot the element and cause the pin 84 to pass into the base portion of the slot 83 and thereby lock the element in its inner or set position. In order to assure this locking action, the inner edge 85 of the base portion of the L-shaped slot 83 is formed to have an increasing radius as the stem of the slot is approached.

Adapted to cooperate with the several rings and the settable elements 75 to complete a rotary switch means is a rotatable member 86 driven through suitable reduction gearing (not shown) from the wall box motor WBM. While the wall box motor may take a variety of forms, including a step by step type of motor, preferably a motor of the synchronous self-starting type, capable of driving the member 86 through the reduction gearing at a speed of approximately 3 R. P. M., is desirable. The member 86 carries, among other things, a wiper WBW1 which is in electrical contact with the ring WBR1, a wiper WBW 2 which is in electrical contact with the ring WBR2, and a wiper WBW3 in contact with the ring WBR3. The wipers WBW1 and WBW3, as best seen in Fig. 7, are electrically connected, while the wiper BW2 is in electrical connection with a restoring finger 87 for the settable elements 75. This finger, as best seen in Fig. 5, is slidably mounted for radial movement at right angles to the member 86 in a bracket 88 carried by a lateral extension 86' of the member 86. The bracket 88 is mounted for adjustment longitudinally of the member 86 to permit of compensation for variation of the drag on and the starting torque of the wall box motor. To that end the extension 86' is formed with elongated slots 86'' in which are slidably received rivets 88' of bracket 88. A screw 88'' journeled in the extension 86' and threaded into the bracket 88 determines the adjustment of the bracket relative to the member 86. The finger 87 is urged outwardly by a compression spring 89 encircling the same, and is limited in its outward movement by a collar 90. In its extended position, the finger 87 engages an element 75 when in its inner or set position, but clears all elements 75 when in their normal outer position.

The member 86 is adapted to be rotated in a clockwise direction, as viewed in Fig. 5. It will be apparent, therefore, that in such clockwise rotation the finger 87 will contact any element 75, when in its inner position, first to complete a circuit, as will presently be described in greater detail, and upon continued movement to pivot the element 75 about its stud 80 until the stem portion of the L-shaped slot 83 is again opposite the pin 84, thereby unlocking the element and permitting the spring 82 to restore it to its normal outward position.

The settable elements 75 are spaced uniform angular distances about the ring WBR3, but preferably leave an enlarged space between the #1 and the #24 element. The spacing of the depression 71 in the ring 69, of course, conforms to the spacing of the elements 75 so that when the wiper 67 engages one of the depressions the finger 64 on the core 60 will be opposite and radially outwardly of the leg 77 of some one of the elements 75. As best seen in Fig. 4, the finger 64 and the leg 77 are of such length that they overlap so that upon energization of the solenoid 59 the finger 64 will engage the leg 77 to shift the same radially inwardly and cause the same to be locked in such inner position, as previously described.

Turning now to the mechanism located in the device to be controlled, herein the phonograph, the selector unit, as previously stated, includes a plurality of rods 31 which are shiftable inwardly, that is, to the right as viewed in Fig. 2, so as to be positioned in the path of the finger 33. In order that these rods may be shifted by a proper selection made at the remote control station or wall box, each rod is surrounded by a coil which, when energized, serves to shift the rod 31 inwardly. In the presenet instance there are twenty-four rods and hence there are also twenty-four coil which, for convenience, may be designated C1 to C24 (see Fig. 7).

The outer or left hand end of the selector unit, as viewed in Fig. 2, is constructed both yieldably to hold the rods 31 in their inner or shifted position, and to form switches SS (see Fig. 7) which, as presently will become more apparent, are connected in parallel. To that end, each rod 31 at its outer end (see Fig. 1a) is formed with an annular groove 95, the end of the rod being electrically conductive, and spaced inwardly from the groove is a non-conducting portion 96. Located radially outwardly of the rods 31 and positioned between adjacent rods are an equal number of studs 97, and coiled about each stud 97 is a torsion spring 98 the ends of which, as best seen in Fig. 1, extend radially inwardly between adjacent rods and at their ends carry small cylindrical rollers 99 which bear against adjacent rods 31. The cylindrical rollers 99 have such axial spacing that, when a rod 31 is shifted inwardly, one roller will engage in the groove 95 to form a yieldable detent holding the rod in its shifted position, while the other roller also is in contact with the electrically conductive portion so that the rod 31 completes a circuit between the rollers 99. When the rod 31 is restored to its normal position, the innermost roller 99 bears on the non-conductive portion 96 so as to break the circuit between the rollers. Alternate studs 97 are connected to the same lead so that the switches formed by the rollers 99 and the outer ends of the rods 31 are connected in parallel. The spring ends are preferably guided in slots 100 formed in guide brackets 101 (see Figs. 1 and 1a).

In order that the selection made at the remote control station may be translated into energization of the proper one of the coils C1 to C24, a master rotary device, as well as relays and other switches located at the phonograph proper, are provided. The majority of these are all located on a single panel, which will hereinafter be designated as the power panel PP, to facilitate convenient adaptation and installation of the remote control system to a phonograph and particularly to a phonograph which previously could be controlled only directly at the phonograph. The rotary switch, like the rotary switch of the wall box, includes a plurality of stationary rings mounted on a plate-like support 102 of non-conducting material. More particularly, it comprises a ring R1 which is broken to provide a separate segment R1S, a ring R2 which is a continuous ring, a ring R3 which also is broken to provide a segment R3S, and a ring R4 which again is broken to provide a segment R4S. Outwardly of the ring R4 is an annular ring made up wholly of rivet-like segments and an enlarged starting segment. The starting segment will herein be referred to as R$t$O, while the remaining rivet-like segments, there being one for each of the coils C1 to C24, will be designated R$t$1 to R$t$24, respectively, considered in a clockwise direction from the starting segment R$t$O. The segment R4S is directly in line with the segment R$t$O, while the segment R1S is spaced approximately 180° from the segment R$t$O and the segment R3S is spaced slightly more than 180° from the segment R$t$O, all for the purposes which will hereinafter become more apparent.

Cooperating with the various rings are wipers carried by an arm 105 which is driven through suitable reduction gearing by the master motor MM in a clockwise direction, as viewed in Figs. 2 and 7. The motor MM is preferably identical with the wall box motor and drives the arm 105 at the same rate as the arm 86, namely, at 3 R. P. M. More particularly, the arm 105 carries wipers W1, W2, W3, W4 and W5, respectively engaging correspondingly numbered rings. Each of the wipers is yieldably mounted and is pressed into engagement with its ring by means of a compression spring 106. As best seen in the diagrammatic Fig. 7, wipers W1 and W5 are electrically interconnected and wipers W2, W3 and W4 are electrically interconnected.

Also mounted on the power panel PP is a tripper relay TR having (see Fig. 7) a single switch TR1, a run relay RR also having a single switch RR1 (see Fig. 7), a starter relay SR having three switches SR1, SR2 and SR3 (see Fig. 7), a resistance 107, a fuse 108, and a transformer T. The rotary switches, relays and other devices described are all of new and improved construction and are electrically connected in a new and improved circuit which will now be described. The transformer T has a primary winding P which, through leads 110 and 111, is connected to the conventional 110-volt 60-cycle source. In parallel with the primary winding P, to derive energy from the same source, is the phonograph motor 13 having one terminal connected by a lead 112 to lead 110, and the other terminal connected by a lead 113 to the lead 111. Interposed in one of the leads, here the lead 113, is the run relay switch RR1. In turn connected in parallel with the phonograph motor 13 so as also to be controlled by the switch RR1 is the amplifier of the phonograph.

The secondary winding of the transformer T is a split winding having a large portion S1 and a minor portion S2. Connected to one end of the winding S1 is a lead L1, while connected to the other end of the winding S1 is a lead L2. These leads constitute the primary power supplying leads to the power panel, as well as to the various remote control stations. The rotary switches provided herein are of such novel construction and their connection in the circuit, as well as the connection of the various relays, is so novel that only four leads need run from the power panel to the various remote control stations. The third of these leads is a lead L3 which is connected to the outer terminal of the winding S2 and includes the coil of the starting relay SR. It will be noted that the circuit for the starting relay thus operates at a slightly higher potential than the main portion of the control circuit, thus assuring operation at all times and, particularly, operation even from the most remotely located wall box. The fourth lead is a lead designated L4, which includes the coil of the tripper relay TR, and is connected to the lead L2.

The mechanism within each remote control station is electrically connected to the leads L1 to L4 in the following manner. A starting circuit for energizing the starter relay SR, as well as for setting a predetermined one of the elements 75, is formed as follows: Lead L1, lead 115, ring 69, wiper 67, solenoid coil 59, wiper 66, ring 68, a lead 116 which includes the coin controlled switch CS, and lead L3. The various rings of the rotary switch are connected as follows: Ring WBR3 constitutes a power ring and is connected by a lead 117 to the lead L1, WBR2 constitutes a selector or tripper ring and is connected by a lead 118 to the lead L4 which contains the coil of the tripper relay TR, and WBR1 constitutes the run ring for the wall box motor WBM and hence is connected by a lead 119 to one terminal of the wall box motor, the other terminal of which is connected by a lead 120 to the lead L2. The lights 56 in the wall box are connected in series between the leads L1 and L2.

The rings of the master rotary switch are connected to the leads L1 to L4 in the following manner: The innermost ring R1 is connected to the lead L1 by a lead 121, which includes the tripper relay switch TR1; the segment R1S of the inner ring R1 is connected to the lead L4 by a lead 122, which includes the starting relay switch SR3. The ring R2 is the power ring for the master rotary switch and for that purpose is connected by a lead 123 to the lead L1. Ring R3 forms part of a temporary holding circuit for the relay SR and is therefore connected by a lead 124 to the lead L3 in advance of the coil of the relay SR. This lead includes the resistance 107 and the switch SR1 controlled by the starter relay. Ring R4 is connected by a jumper 125 to the starting segment R$t$O, which in turn is connected by a lead 126 to the one terminal of the master motor MM, the other terminal of which is connected by a lead 127 to the lead L2. The remaining segments R$t$1 to R$t$24 of the outermost ring are, respectively, connected by leads 128$^1$, 128$^2$ and so forth to coils C1 to C24, the other ends of the coils being connected to the lead L2. A lead 129 which includes the switch SR2 of the starting relay is connected at one end to the lead L1 and at the other end to the lead 126 to form a starting circuit for the master motor MM.

The circuit is completed by a lead 130 connected at one end to the lead L1 and at the other end connected to a common side of the selector switches SS. Connected to the remaining common side of the switches SS is a lead 131 connected to one terminal of the coil of the run relay RR, the other terminal of which is connected to the lead L2. In parallel with the switches SS is a mercury switch MC which, as best seen in Figs. 1 and 2, is mounted on one arm of the crank 25. The mercury switch is of such construction and is so mounted on the crank 25 that it is open when the turntable 12 is in its lowered, inoperative position, but closes upon the first upward movement of the turntable 12. In this manner the mercury switch carries the load during the major portion of each cycle of operation of the phonograph, and also serves to maintain the relay RR energized after the last rod 31 has been restored to normal position.

The functions and advantages of the remote control system herein disclosed, it is believed, will best be understood from the following description of the operation of the system. For purposes of considering the operation, let it be assumed that the phonograph is idle, that no selection has been made, and that therefore all of the parts are in their normal positions which are shown in Figs. 1, 2, 3 and 7. For convenience in disclosure, the arm 86 of the wall box switch, as shown in Figs. 4 and 5, has been rotated approximately 90° in a clockwise direction from its normal position. In other words, the normal position of the arm 86 is with the wiper WBW3 in engagement with the segment 72. Under the conditions above expressed, neither the phonograph motor 13, nor the master motor MM, nor the wall box motor WBM of the several remote control stations are operating.

To make a selection and to initiate operation of the phonograph, the dial 48 is rotated to bring the number corresponding to the record desired to be heard opposite the arrow 55 on the front wall of the wall box. If it is assumed that it is desired to have the #2 record played, the dial will be rotated to place the #2 opposite the arrow. As an incident to such rotation, the finger 64 of the solenoid 59 will be brought opposite the correct element 75, in this instance the second element from the bottom in Fig. 5, considered in a clockwise direction. Having indicated the choice of record, a coin or token is then dropped in the coin receptacle 47, which closes the switch CS to complete a circuit from the lead L1 through the solenoid 59, the lead L3 and the coil of the starter relay SR to energize the same. Completion of this circuit serves two functions. First energization of the solenoid 59 causes its core 60 to be drawn radially inwardly and thus, through the finger 64, shift inwardly one of the elements 75. Though the energization of the solenoid 59 is, of course, only momentary, the element 75 remains in its inner shifted position because of the novel locking movement given to it by the cam surface 79.

The second function of the completion of the starting circuit is the energization of the starting relay SR. Such energization of the relay SR effects the closing of its three normally open switches SR1, SR2 and SR3. Closure of switch SR1 establishes a temporary holding circuit for the relay SR which is as follows: Lead L1, lead 123, ring R2, wiper W2 and wiper W3 which are electrically interconnected, ring R3, lead 124, switch SR1 and starting relay SR to lead L3. Closure of switch SR2 completes a starting circuit for the master motor MM which is as follows: Lead L1, lead 129 which includes switch SR2, lead 126, the master motor and lead 127 to lead L2. Closure of SR3 establishes a starting circuit for the wall box motor WBM, which circuit is as follows: Lead L1, lead 129 which includes the now closed switch SR2, lead 126, starting segment RtO, wipers W5 and W1 which are electrically interconnected, the segment R1S of the innermost ring, lead 122 which includes the now closed switch SR3, lead L4, lead 118, ring WBR2, jumper 72', segment 72, wipers WBW3 and WBW1 which are electrically interconnected, ring WBR1, lead 119, wall box motor WBM, and lead 120 to lead L2. Both the master motor MM and the wall box motor WBM are now operating, having been started simultaneously, and driving their respective rotary switches at the same rate.

With the master motor and the wall box motor now running, various new circuits are established or conditioned by the rotary switches to assure the proper operation of the control system. Thus before wiper W3 strikes segment R3S to break the holding circuit for the starter relay, which would open switch SR2 and thus break the circuit to the master motor, wiper W4 makes contact with ring R4 to establish a running circuit for the master motor which is as follows: Lead L1, lead 123, ring R2, wipers W2 and W4 which are electrically connected, ring R4, lead 125, segment RtO, and lead 126 to the motor and from the motor by lead 127 to lead L2. This running circuit for the master motor will remain completed and thus cause continued operation of the master motor until the arm 105 has been rotated through one complete revolution, at which time the wiper W4 will again contact the segment R4S, thereby breaking the motor circuit. Similarly, a running circuit is established for the wall box motor before the holding circuit to the starting relay SR is broken. In the case of the rotary switch of the wall box, the wiper WBW3 is such that it contacts the ring WBR3 before it breaks contact with the segment 72. The running circuit for the wall box motor is then from lead L1 through lead 117 to ring WBR3, wipers WBW3 and WBW1 which are electrically connected, ring WBR1, lead 119, the wall box motor, and lead 120 to the lead L2. This circuit will also remain closed until the arm 86 has completed one revolution, that is, until the wiper WBW3 again contacts the segment 72.

With the initial rotation of the arm 105, the wiper W1 leaves the segment R1S and also makes on the ring R1 prior to the time that the wiper W5 makes contact with the segment Rt1. This timing is essential, in order that a circuit may be completed upon closure of the switch TR1 for the purpose of energizing the coil C1, should the selection made at the remote control station require the energization of that coil. Also before wiper W5 contacts segment Rt1, wiper W3 momentarily breaks with ring R3 in order to break the holding circuit for the starting relay SR. The wiper W3, of course, immediately again makes on the ring R3 so as to condition the holding circuit for the starter relay SR. This timing is essential, in order that the coil C1 may not be energized when it is not intended that it should be, and in order that the starting relay SR and particularly its holding circuit may be conditioned to respond to the closing of any one of the coin switches CS, particularly during the time that the wiper W5 is travelling between the segments RtO and Rt1. This feature is particularly applicable to the #1 record and its corresponding coil C1, and assures that the mechanism will recycle and cause the #1 record to be played. Without this timing, it is conceivable that the #1 record might be selected just too late to be picked up in the first cycle of the control system and with the deposit of the coin cancelled by a subsequent breaking of the holding circuit for the starter relay SR.

With the continued operation of the master and wall box motors, the arms 105 and 86 are, of course, rotated in timed relation. With the exception of the changes which take place while wiper W5 is travelling from the segment R$t$0 to the segment R$t$1, no further changes take place during the remainder of the cycle with respect to the wipers W1 to W4. W5, however, in its successive engagement with the segments R$t$1, R$t$2 and so forth, establishes conditional circuits to the coils C1, C2 and so forth. The completion of such conditional circuits is dependent upon closure of the switch TR1 controlled by the tripper relay TR. The energization of this relay is under the control of the rotary switch at the wall box and is energized only at such times as the finger 87 strikes an element 75 which has been shifted into the path of the finger. It is to be understood, of course, that the finger 87 is opposite an element 75 corresponding to a certain one of the coils C1 to C24 at the same time that the wiper W5 is in contact with the corresponding segment R$t$1 to R$t$24.

Thus, in the example assumed, the finger 87 will strike the second of the elements 75 thereby completing a circuit for the tripper relay which is as follows: Lead L1, lead 117 to the ring WBR3 with which the elements 75 are in electrical contact, finger 87 and wiper WBW2, ring WBR2, lead 118 to lead L4 which contains the coil of the tripper relay TR. Upon energization of the tripper relay, the switch TR1 controlled thereby is closed, thereby completing a circuit to coil C2 as follows: Lead L1, lead 121 which contains the now closed switch TR1, ring R1, wipers W1 and W5 which are electrically connected, segment R$t$2, and lead 128$^2$ to coil C2 which has its other terminal connected to the lead L2.

With the energization of the coil C2, the rod 31 governed by the coil C2 is shifted inwardly, thereby closing one of the switches SS to complete a circuit to the coil of the run relay RR which, upon energization, closes the switch RR1 to initiate operation of the phonograph motor 13. With the initiation of operation of the phonograph motor, the mechanism of the phonograph is driven as previously described, causing the shaft 29 to rotate until the finger 33 strikes the rod 31 which has been shifted inwardly to select the corresponding record and cause the same to be picked up by the rotating and upwardly moving turntable 12. With the initial upward movement of the turntable 12, the mercury switch MC is closed to take the load off of the switches SS and also to maintain the run relay RR energized until the table 12 has been returned to its normal lowered position after the circuit for the run relay would otherwise have been broken by restoration of the rod 31 to its normal position.

In Fig. 8 there is shown a modified form of master rotary switch which may be employed where the wall box motors are not sufficiently accurately constructed to assure their exact synchronous operation with one another and with the master motor. Whereas most motors are sufficiently accurately and well enough constructed to remain in synchronism for one cycle or one complete rotation of the rotary switches, even the slightest variation would prove detrimental if permitted to accumulate, as would be the case when the selections are made so rapidly that the motors operate continuously for several revolutions of the rotary switches.

It is the purpose of this modified form of rotary switch to cause the wall box motor to come to rest after each cycle of operation, regardless of the rapidity with which selections are made. To that end, the rotary master switch is so designed that its cycle will be completed a short time after the cycle of the wall box rotary switch will be completed, thereby giving the wall box motors ample opportunity to come to rest before they are again set in operation. This is accomplished without change in the construction or circuit connections of the master rotary switch, save that the segments R$t$0' to R$t$24' are spaced closer to one another so that they extend over substantially less than 360°. The motor driving the arm of the rotary switch is given a correspondingly lower R. P. M., in order that the arm of the master switch will still rotate in uniform and timed relation with the arm of the wall box switch. Thus the operation is the same in all respects as in the preferred form just described, but after the rotary switch arm is past the last segment R$t$24' it will rotate for a sufficient additional period before contact is made with the starting segment R$t$0' that all wall box motors will have completed their cycle of operation and have come to rest, even though a particular one may be slightly out of phase. Thus, when they are again operated, they will all be started simultaneously with the master motor and there will be no opportunity for such differential as does exist to become cumulative and thus grow into a detrimental factor.

It is believed apparent from the foregoing disclosure that we have provided a novel remote selector and control system particularly well adapted for use on automatic phonographs. The system is advantageous, first, in its simplicity and minimum number of leads required to be run from the remote control stations to the phonograph or other device to be controlled. This same feature, of course, also greatly reduces the cost of the system in that much wiring is eliminated. The system has the additional features that there is no possibility that any selections made at the remote stations will be lost because of the simultaneous, or near simultaneous, making of a selection at some other station. Also, the obtaining of a wholly different selection resulting from the garbling of two simultaneously made selections is also avoided. Other features, such as the employment of a somewhat higher voltage for the starter relay to assure its energization even under control of the most remotely located control station, and the elimination from the circuits for the coils to be selectively energized of all elements at the remote stations, will have been apparent from the disclosure.

We claim as our invention:

1. A remote control system comprising, in combination, a plurality of devices to be selectively energized located at the object to be controlled, a first normally idle power driven means conditioning when operating a circuit including each of said devices in succession, a remotely located control unit including a second normally idle power driven means adapted to operate in timed relation with said first power driven means, a settable element corresponding to each of said devices and means operable to send a starting impulse, means at the object to be controlled responsive to the starting impulse and operable simultaneously to initiate operation of both said power driven means, said second power driven means sending an impulse upon reaching the settable element previously set, and means located at the object to be controlled responsive to said last mentioned impulse to complete the circuit conditioned by said first power driven means to energize said device then in circuit.

2. A remote control system comprising, in combination, a plurality of devices to be selectively energized located at the object to be controlled, a master rotary switch operable upon rotation to condition a circuit including each of said devices in succession, a master motor for driving said rotary switch, said switch being normally stationary, a remotely located control unit including an auxiliary rotary switch, an auxiliary motor for driving said auxiliary rotary switch in timed relation with said master switch, said auxiliary switch including a settable element corresponding to each of said devices and a rotary element adapted to engage set elements, manually rotatable means adjustable to indicate energization of the particular device desired, a solenoid carried by said manually rotatable means operable upon energization to shift the selected settable element to set position and means for energizing said solenoid and for sending a starting impulse, means at the object to be controlled responsive to the starting impulse and operable simultaneously to initiate operation of both said motors, said auxiliary switch sending an impulse upon engagement of said rotary element with the set element, and means located at the object to be controlled responsive to said last mentioned impulse to complete the circuit conditioned by said master rotary switch to energize the one of said devices in circuit at the time of the sending of the impulse.

3. A remote control system comprising, in combination, a plurality of devices to be selectively energized located at the object to be controlled, a first motor driven rotary switch located at the object to be controlled conditioning a circuit including each of said devices in succession, said switch being normally idle, a remotely located control unit including means for making a selection and a second motor driven rotary switch connected in circuit with said first switch and governing completion of the conditioned circuit when the one of said devices corresponding to a preselection made is in circuit, said second switch also being normally idle but adapted when in operation to rotate in timed relation with said first switch, and storage means located at the object to be controlled operable with the making of a selection for initiating operation of both said rotary switches and operable to cause a recycling of said switches when a selection is made while said switches are rotating.

4. A remote control system comprising, in combination, a plurality of devices to be selectively energized located at the object to be controlled, a first motor driven rotary switch conditioning a circuit including each of said devices in succession, said switch being normally idle, a remotely located control unit comprising a manually settable dial and setting means movable therewith, a second motor driven rotary switch including settable elements one for each of said devices to be energized, and tripper means for set elements rotating in timed relation with said first rotary switch, said second rotary switch being normally idle but operable upon engagement with a set element to cause completion of the conditioned circuit, and means for actuating said setting means and initiating operation of both said rotary switches.

5. A remote control system comprising, in combination, a plurality of devices to be selectively energized located at the object to be controlled, a first normally idle motor driven rotary switch for selecting a device to be energized, a remotely located control unit in circuit with said first switch and comprising a manually rotatable dial and setting means movable therewith, a second normally idle motor driven rotary switch including settable elements one for each of said devices to be energized, and means for actuating said setting means and simultaneously initiating operation of both said rotary switches.

6. In a remote control system, a master device to be energized, a remotely located auxiliary device to be energized, a starting relay controlling initial energization of said devices, a remotely located manually operable selection indicating means, settable elements, setting means carried by said manual means for setting a selected one of said elements, and a circuit including said relay, said setting means and a manually controllable switch for energizing said relay and said setting means upon closure of said switch.

7. In a remote control system, a master device to be energized, including a rotary switch, a remotely located auxiliary device to be energized, a starting relay located at the master device controlling a plurality of normally open switches, an energizing circuit for said relay controllable from a remote point, a holding circuit for said relay including one of said relay controlled switches and said rotary switch, a starting circuit for said master device including another of said relay controlled switches, and a starting circuit for said auxiliary device including a third of said relay controlled switches.

8. In a remote control system, a rotary switch, a motor for driving the same, a relay having a plurality of normally open switches, a starting circuit for said motor including one of said relay switches, an energizing circuit for said relay including a remote temporarily closable switch, and a temporary holding circuit for said relay including one of said relay switches and said rotary switch, said rotary switch during its initial rotation breaking said holding circuit and again conditioning the same to adapt said relay for reenergization by closure of said remote switch during rotation of said rotary switch.

9. In a remote control system, a rotary switch, a motor for driving the same, a relay having a plurality of normally open switches, a starting circuit for said motor including one of said relay switches, a normally open running circuit for said motor including said rotary switch, an energizing circuit for said relay including a remote temporarily closable switch, and a temporary holding circuit for said relay including one of said relay switches and said rotary switch, said rotary switch during its initial rotation breaking said holding circuit and again conditioning the same to adapt said relay for reenergization by closure of said remote switch during rotation of said rotary switch and completing said running circuit prior to breaking of said holding circuit.

10. In a remote control system, a plurality of electrical devices to be energized selectively, a rotary switch having a plurality of stationary contacts connected one to each of said devices and a movable switch element engageable with said contacts and having a zero position, a motor for driving said rotary switch, a relay having a plurality of normally open switches, a starting circuit for said motor including one of said relay switches, an energizing circuit for said relay including a remote temporarily closable switch, a temporary holding circuit for said relay including one of said relay switches and said rotary switch, and an energizing circuit including said rotary switch and including each of said devices in succession, said rotary switch breaking said holding circuit prior to engagement of said movable switch element with the first of said stationary contacts.

11. In a remote control system, a plurality of electrical devices to be energized selectively, a first rotary switch electrically connected to said devices, a master motor for driving said rotary switch, a second rotary switch remotely located and electrically interconnected with said first switch, an auxiliary motor for driving said second switch in timed relation with said first switch, a starting circuit for said master motor, a starting circuit for said auxiliary motor including said first rotary switch and conditioned when said first rotary switch is in normal position, a relay located at the first rotary switch having switches governing both said starting circuits, and an energizing circuit for said relay controllable from a remote point.

12. In a remote control system, a first rotary switch having a zero position, a master motor for driving the same, a remote control unit comprising a second rotary switch and an auxiliary motor for driving the same in timed relation with said first switch, a relay having a plurality of normally open switches, a starting circuit for said mater motor including one of said relay switches, a starting circuit for said auxiliary motor including at least one of said relay switches and said first rotary switch, said first rotary switch conditioning the starting circuit for said auxiliary motor when in zero position, and an energizing circuit for said relay including a normally open switch at said remote station, said second rotary switch completing a running circuit for said auxiliary motor prior to interruption of the starting circuit therefor by said first rotary switch.

13. In a remote control system, a plurality of devices to be energized selectively, a first rotary switch including a plurality of contacts connected one to each of said devices and a rotary switch arm adapted to engage said contacts, a first motor for driving said rotary switch, a second remotely located rotary switch including a plurality of settable switch elements one for each of said devices and a rotary switch arm adapted to engage settable switch elements when in set position, the contacts of said first rotary switch and the settable switch elements of said second rotary switch having the same angular spacing, a second motor for driving said second rotary switch, said motors being adapted to operate in synchronism and to drive the switch arms at the same rate, a relay having a plurality of normally open switches, a starting circuit for said first motor including one of said relay switches, a starting circuit for said second motor including one of said relay switches and said first rotary switch, said first rotary switch when at rest making the starting circuit for said second motor, and an energizing circuit for said relay completed by the making of a selection at said second rotary switch.

14. In a remote control system, a plurality of devices to be energized selectively, a first rotary switch including a plurality of contacts connected one to each of said devices and a rotary switch arm adapted to engage said contacts, a first motor for driving said rotary switch, a second remotely located rotary switch in electrical circuit with said first rotary switch including a plurality of settable switch elements one for each of said devices and a rotary switch arm adapted to engage settable switch elements when in set position, the contacts of said first switch having a smaller angular spacing than the elements of said second switch, and a second motor for driving said second rotary switch at a rate above said first rotary switch corresponding to the increase in angular spacing of the elements of said second rotary switch.

15. In a remote control system, a plurality of devices to be energized selectively, a first rotary switch including a plurality of annularly arranged contacts connected one to each of said devices and a rotary switch arm adapted to engage said contacts, a first motor for driving said rotary switch, a second remotely located rotary switch including a plurality of settable switch elements one for each of said devices, and a rotary switch arm adapted to engage settable switch elements when in set position, the elements of said second switch being uniformly spaced angularly over substantially 360°, the contacts of said first switch having a smaller angular spacing than the elements of said second switch to extend over substantially less than 360°, a second motor for driving said second rotary switch at a rate above said first rotary switch corresponding to the increase in angular spacing of the elements of said second rotary switch, a starting circuit for said first motor, a running circuit for said first motor including said first rotary switch, said first rotary switch maintaining said running circuit until its rotary switch arm has been driven through one complete revolution, a starting circuit for said second motor including said first rotary switch, the starting circuit for said second motor being made at said first rotary switch only when in zero position, and a running circuit for said second motor including said second rotary switch, said second rotary switch maintaining said running circuit only for one complete revolution of its rotary switch arm whereby said second motor is brought to rest prior to each completion of one revolution of the switch arm of said first rotary switch.

16. A remote control system comprising in combination, a plurality of devices to be selectively energized located at a main station, a first motor driven rotary switch conditioning a circuit including each of said devices in succession, said switch being normally idle, a remotely located control station including means for making a selection and a second motor driven rotary switch connected in circuit with said first switch and governing completion of the conditioned circuit when the one of said devices corresponding to a preselection made is in circuit, said second switch also being normally idle but adapted when in operation to rotate in timed relation with said first switch, means at the remote station for sending a starting impulse, and a storage device at the main station for holding a starting impulse received from the remote station during operation of said switches effective to recycle the switches.

17. In a remote control system, a plurality of electrical devices to be energized selectively, a rotary switch having a plurality of stationary contacts connected one to each of said devices and a movable switch element engageable with said contacts and having a zero position, a motor for driving said rotary switch, a relay having a plurality of normally open switches, a starting circuit for said motor including one of said relay switches, a temporary energizing circuit for said relay, a temporary holding circuit for said relay including said rotary switch, and an energizing circuit for said devices including said rotary switch and each of said devices in succession, said rotary switch breaking said holding circuit prior to engagement of said movable switch element with the first of said stationary contacts.

18. In a remote control system, a plurality of electrical devices to be energized selectively, a rotary switch having a plurality of stationary contacts connected one to each of said devices and a movable switch element engageable with said contacts and having a zero position, a motor for driving said rotary switch, a relay having a plurality of normally open switches, a starting circuit for said motor including one of said relay switches, an energizing circuit for said relay including a remote temporarily closable switch, a temporary holding circuit for said relay including one of said relay switches and said rotary switch, and an energizing circuit for said devices including said rotary switch and each of said devices in succession, said rotary switch breaking and again reconditioning said holding circuit prior to engagement of said movable switch element with the first of said stationary contacts.

19. In a remote control system, a plurality of electrical devices to be energized selectively, a rotary switch having a plurality of stationary contacts at all times connected one to each of said devices, an interrupted ring contact and a movable switch element having a first wiper engageable with said stationary contacts and a second wiper engageable with said ring contact, said switch element having a zero position with the wipers out of engagement respectively with said stationary contacts and said ring contact, and an energizing circuit including said rotary switch and including each of said devices in succession, the second wiper of said switch element making engagement with said ring contact prior to engagement of said first wiper with the first of said stationary contacts.

20. A remote control system comprising, in combination, a plurality of devices to be selectively energized located at the object to be controlled, a first rotary switch having a plurality of stationary contacts connected one to each of said devices, a plurality of contact rings and a movable switch element having wipers engageable with said contacts and contact rings, said element having a zero position, a normally idle motor for driving said movable switch element, a relay having a plurality of normally open switches, a second rotary switch having a plurality of settable elements corresponding to each of said devices, a plurality of contact rings and a movable switch element engageable with said contact rings and set settable elements, a second motor for driving said last mentioned switch element operating in timed relation with said first mentioned motor, an energizing circuit for said relay including a remote temporarily closable switch, a temporary holding circuit for said relay including one of said relay switches and said first rotary switch, a temporary starting circuit for said first motor including one of said relay switches, a temporary starting circuit for said second motor including one of said relay switches and said first rotary switch, said first rotary switch breaking and again reconditioning the temporary holding circuit for said relay prior to engagement of its movable switch element with the first stationary contact and also establishing a running circuit for said first motor prior to breaking of said temporary holding circuit, and said second rotary switch establishing a running circuit for said second motor prior to breaking of the temporary holding circuit for said relay.

HUBERT L. BRYAN.
MELVIN J. BINKS.